EDWARD F. BURTON
ALLAN B. ROGERS SR.
INVENTORS

BY
*J. Edwin Coates*
ATTORNEY

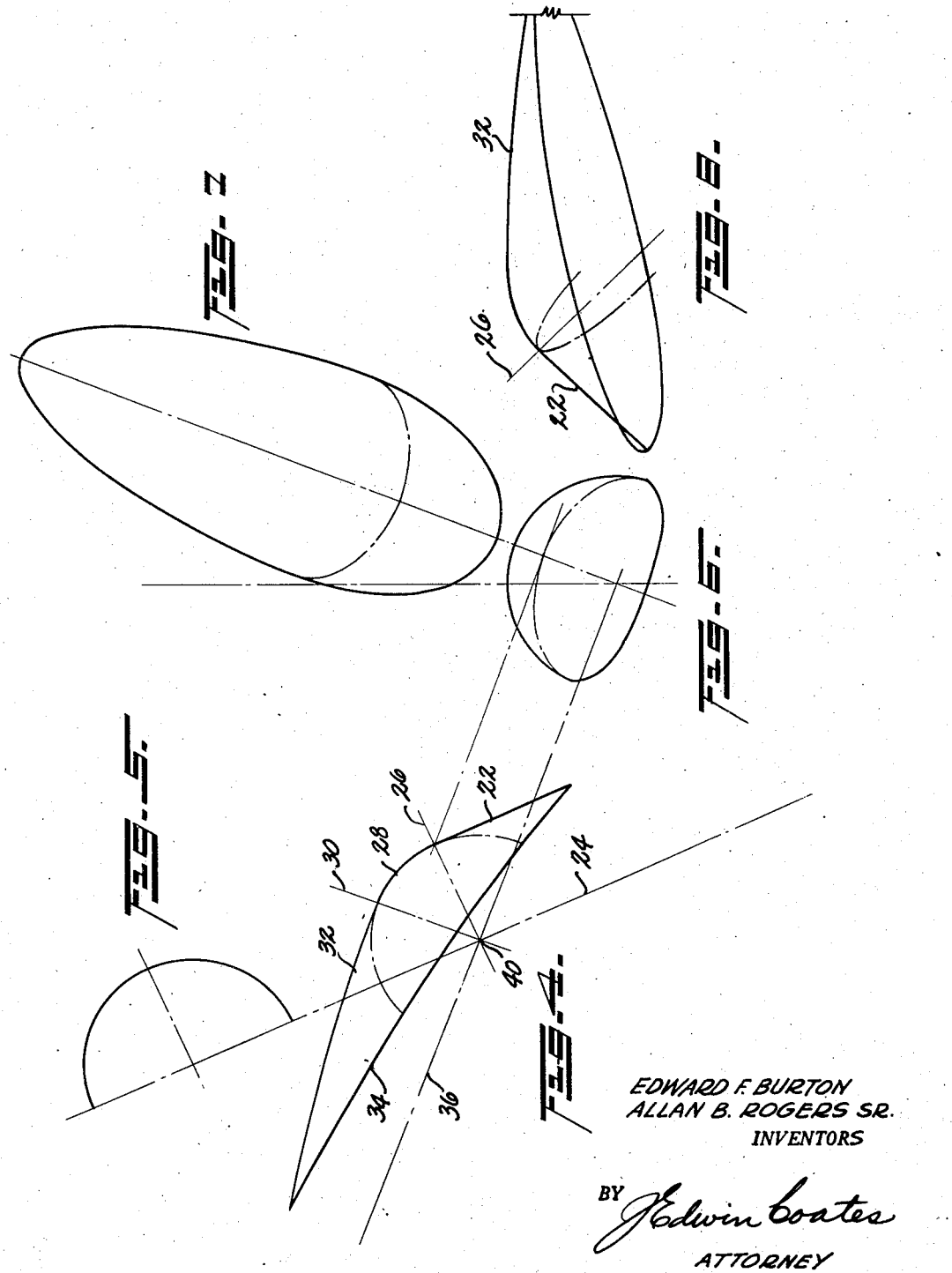

Sept. 25, 1945.　　　E. F. BURTON ET AL　　　2,385,684
PILOT ENCLOSURE
Filed Sept. 21, 1942　　　3 Sheets-Sheet 3
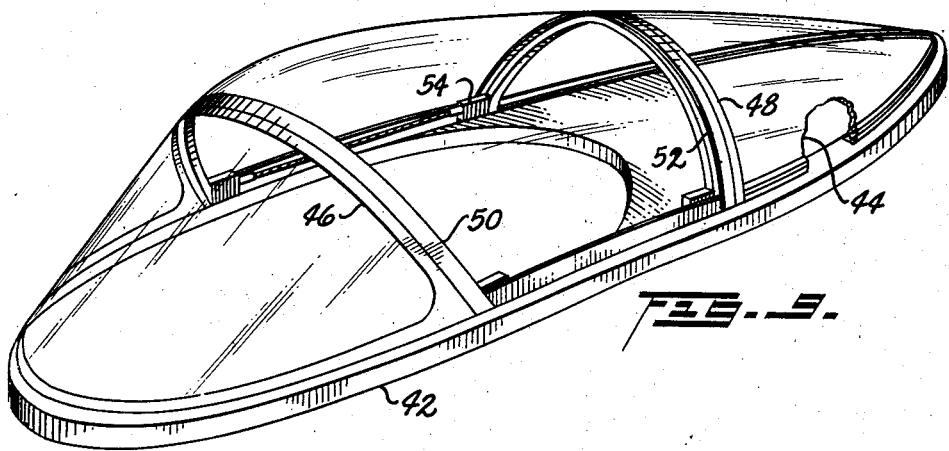
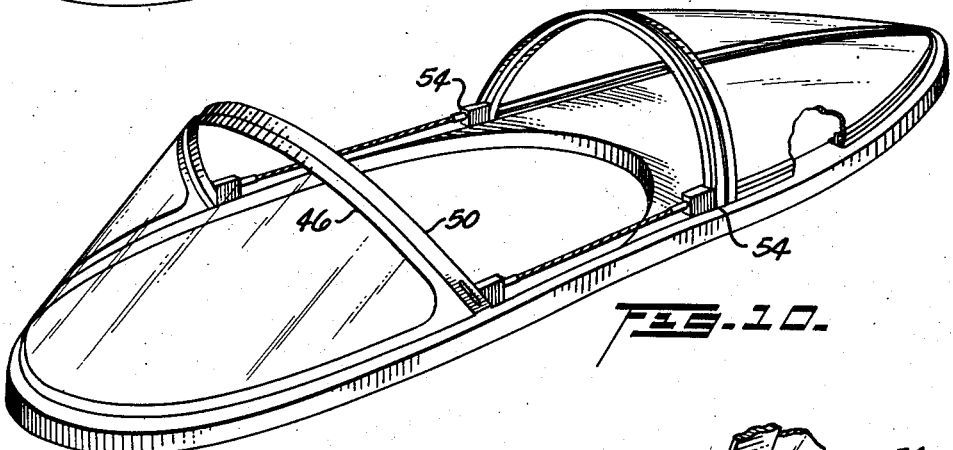
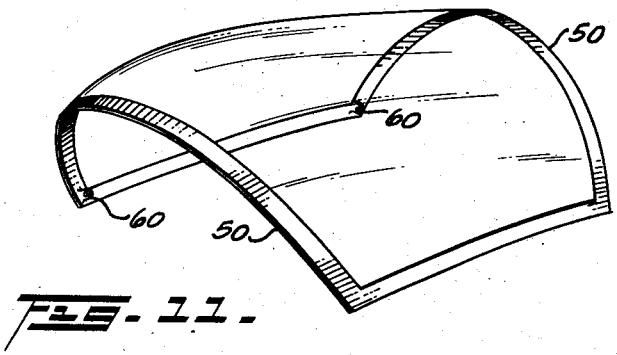
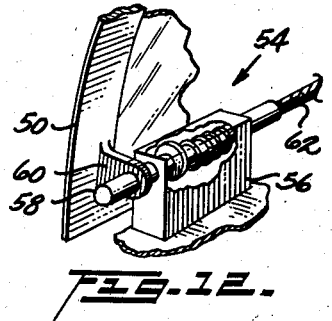
EDWARD F. BURTON
ALLAN B. ROGERS SR.
INVENTORS
BY J. Edwin Coates
ATTORNEY Patented Sept. 25, 1945

2,385,684

UNITED STATES PATENT OFFICE 2,385,684

PILOT ENCLOSURE

Edward F. Burton, West Los Angeles, and Allan B. Rogers, Sr., Santa Monica, Calif., assignors to Douglas Aircraft Company, Inc., Santa Monica, Calif.

Application September 21, 1942, Serial No. 459,212

4 Claims. (Cl. 244—121)

This invention relates to aircraft and other vehicles in which streamlining and the strength-weight ratio are important design considerations. The invention is particularly concerned with the pilots' or operators' enclosure portion of the aircraft or other vehicle body and constitutes a radical departure from previous practice.

The enclosure of this invention affords visibility not obtainable in present designs and at the same time is inherently strong and light, aerodynamically efficient and inexpensive to fabricate.

In aircraft, for instance, the modern trend is toward fuselages of substantially circular cross-section, which shape is extremely well adapted to streamlining and in addition offers the most desirable strength to weight ratio. Obviously the latter is always an important design factor in the aircraft field and the advent of the pressure cabin has, if possible, increased its importance for the reason that, in addition to the normal stresses, a pressure differential between the interior and exterior of the cabin must be taken into account.

The pressure differential problem has always been relatively serious in aircraft and the present trend is making this problem even more difficult because it is now desired that airplanes fly at altitudes of thirty to forty thousand feet and above, thus making it necessary that these craft be as light as possible in order to attain altitudes of this order and at the same time withstand the greater difference in pressure between the ambient and the interior pressure which must be pressurized to a degree permitting at least reasonable physiological comfort.

The characteristic of hoop tension has long been utilized in the design of structures which are to be subjected to an appreciable pressure differential and the principle has been used to advantage in aircraft construction since, as stated, shapes embodying the characteristic are efficient from a streamlining standpoint. However, the pilots' compartment of an aircraft has always presented a problem because, in the past, it has been necessary to deviate from the circular cross-sectional shape in order to obtain the desired visibility. It is true that some aircraft designs have not deviated from the circular cross-section in the location of the pilots' compartment, having merely transparent panels therein, but in thus simplifying the design the pilots' visibility has been sacrificed.

As evidence of the importance of pilots' enclosure design in aeronautical engineering, there have been instances where the design of only that section of the airplane has consumed as much as twenty per cent of the total engineering time involved in the entire craft. The reasons for this fact have been set forth more or less hereinbefore. In order to obtain the desired strength-weight ratio in a structure having a minimum of aerodynamic resistance the structure should be substantially circular in cross-section. But, on the other hand, a structure of substantially circular cross-section is not at all conducive to good pilot visibility.

It is these two seemingly opposed conditions that have presented the problem to airplane designers, which problem has been solved by our invention. Had we been content to sacrifice pilot visibility for strength considerations we would have carried the circular cross-section design throughout the entire fuselage, tapering from the point of maximum diameter to the nose. Since it is necessary that when a person is seated comfortably his legs be permitted to extend forwardly, space must be provided, say in the fuselage nose, so that he may assume this position. Furthermore, it is desirable that the necessary instruments and controls be placed in front of him. This, then, means that the pilot must be placed in such a position that his eyes, being within the fuselage diameter, are considerably aft of the forward extremity of the fuselage making it impossible for him to look downwardly in a forward direction. In addition, since the natural taper of the fuselage is quite gradual, any transparent panel placed therein would cross the pilots' line of vision at a very sharp angle so that any forward vision, other than in an upward direction would be badly distorted.

Most aircraft construction makes use of "Plexiglas" material wherever transparent panels are needed. This is a very fine plastic material, well suited for forming to desired contours, but in order to obtain the full optical efficiency thereof it is necessary that the optical path lie as close as possible to the perpendicular relative to a flat sheet of the material and in no instance should the angle of incidence exceed 45 degrees. Obviously, the best vision can be obtained from flat sections but where these are not desirable from the standpoint of streamlining or other structural considerations, the second choice goes to either simple cylindrical or simple spherical sections with the observer's eyes preferably located at the center of the curvature. It therefore may be seen that in the arrangement just discussed it is impossible to obtain any high degree of optical efficiency at the desired angles of vision.

Now, to consider sideward vision, inasmuch as the fuselage cross-section is circular it is necessary that the pilot be placed inboard from the side thereof in order to obtain sufficient height. This natural requirement of such a design as is being discussed results in the same poor visibility condition toward the side and downward as we had when looking toward the front and downward.

It is an accepted fact that the two most critical operations involved in piloting an aircraft under normal conditions are takeoff and landing. In both of these operations, and particularly while landing, excellence of downward vision both in a forward direction and to the side is a vital necessity. Therefore, the theoretical design wherein pilot visibility is sacrificed to strength considerations is not to be desired.

Let us now consider attacking the problem from the other side. That is to say, let us forego the advantages of carrying the circular cross-section throughout the fuselage, departing from it to construct the pilots' enclosure along conventional lines, which lines afford reasonably good visibility. First we have the difficulty of merging the circular cross-section construction with a non-circular construction aft of the enclosure and then again changing from non-circular to circular forward thereof. Immediately there is a substantial increase in production time and the accompanying expense, two very undesirable items particularly at the present time.

Secondly, since it is necessary that the craft fly at extremely high altitudes it is equally necessary that the interior thereof, and particularly the pilots' enclosure, be pressurized in order that the crew be not physically disabled by the rarefied atmosphere and low pressures prevailing at those high altitudes. Therefore, since the non-circular-good visibility enclosure must stand the required pressure differential and does not embody the low weight-high strength hoop tension characteristic, the construction thereof must be of a heavier type than the remainder of the fuselage thus lowering the efficiency of the airplane as a whole.

It is then the principal object of our invention to provide in an aircraft fuselage of substantially circular cross-sectional shape pilots' enclosures affording high visibility and incorporating the characteristic of hoop tension.

It is a further object of the invention to provide an aircraft fuselage in which is combined high pilot visibility with high strength-low weight construction.

Another object of the invention lies in the provision of an aerodynamically efficient and inexpensively constructable, high visibility pilots' compartment for an aircraft adapted to withstand a relatively high pressure differential.

A still further object is to provide in an aircraft fuselage having hoop tension characteristics and aerodynamic efficiency a superposed pilots' head enclosure without materially affecting the strength thereof or its streamlined shape, which enclosure likewise has hoop tension characteristics and aerodynamic efficiency.

It is another object to provide in an enclosure having the features herein set forth a quickly removable portion sufficiently large to permit the passage of a human body in event of an emergency.

Other and further objects will become apparent while reading the following detailed description of the invention with reference to the drawings in which:

Figure 4 is a true side elevational view of the enclosure showing the constructional geometry thereof, and Figures 5 and 6 are schematic views projected from Figure 4 in the directions indicated, the former showing the true outline of the semicylindrical and hemispherical portions of the enclosure, and the latter showing these sections as they appear in front elevation.

Figure 7 is a schematic view projected from Figure 6 showing the enclosure as it appears in true plan, and Figure 8 is a schematic view projected from Figures 6 and 7 showing the enclosure as it appears in side elevation at its position on the aircraft fuselage wherein its plane of symmetry extends substantially through the longitudinal axis of the fuselage at an angle from the vertical.

Figure 9 is a perspective view of an embodiment of one of the individual "bug-eye" enclosures of our invention showing a framing construction therefor including a removable section.

Figure 10 is a perspective view similar to Figure 9 showing the enclosure without the removable section in place.

Figure 11 is a perspective view of the removable section; and

Figure 12 is a fragmentary detail of one of the latching devices for securing the removable section to the principal structure of the enclosure.

Figure 1:
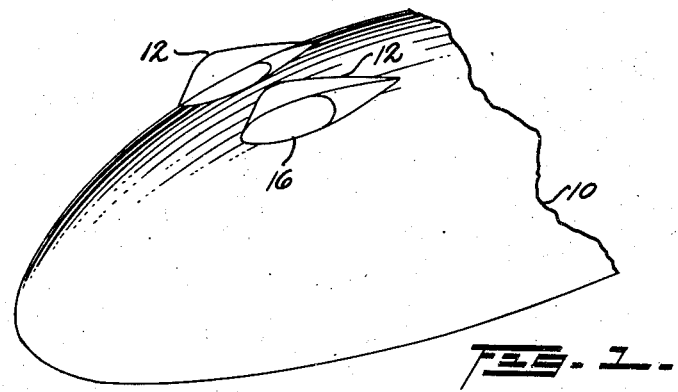
Figure 1 is a perspective view of the nose portion of an aircraft fuselage incorporating the individual "bug-eye" pilot enclosures of our invention.

With reference now to the drawings, Figure 1 shows the nose portion of a fuselage 10 tapering downwardly and being provided on its downward taper with a pair of bulbous enclosures 12 formed from bodies of revolution. One of these enclosures is positioned over each of a pair of pilots' seats 14 in the manner shown in Figures 2 and 3, and an opening 16 is made in the fuselage skin 18 so that when the pilots are seated their heads may extend through their respective openings, beyond the confines of the fuselage and into the bulbous enclosures.

The approximate position of each pilot's eyes is indicated by markers 20 and it may be seen that the eyes are substantially at the intersection of the center lines or radius of all surfaces combined to form the bulbous enclosure. This positioning affords the best results for the reason that the line of vision in any desired direction is never at a very sharp angle to the curvature thus minimizing distortion.

In addition to the fine visibility feature the enclosure comprising this invention is ideally adaptable to pressure fuselage construction; that is a fuselage which is adapted to withstand a differential between a normal pressure in the interior thereof and a relatively low pressure which is encountered at high altitudes. Since these enclosures are formed from bodies of revolution they incorporate the hoop tension characteristic and therefore they may be fitted into the wall of an aircraft fuselage of substantially circular cross-section incorporating the same hoop tension characteristic. This combination results in a lighter and less expensive structure and at the same time affords excellent visibility.

Figure 2:
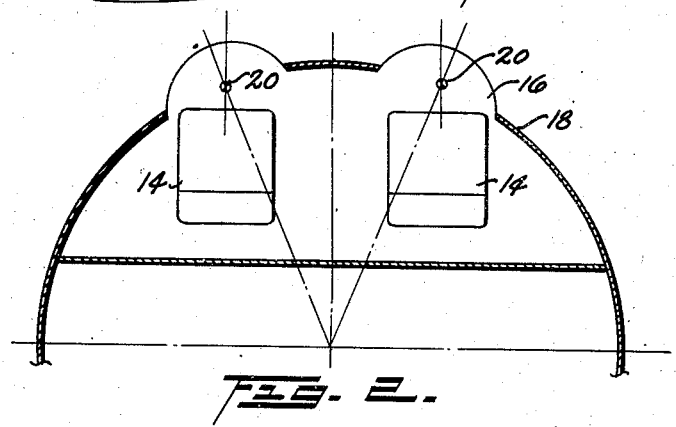
Figure 2 is a sectional view taken through the pilots' compartment of a circular cross-section aircraft fuselage in wihch is shown the relationship of the individual enclosures to the longitudinal axis of the fuselage and the pilots' seats.
Figure 3:
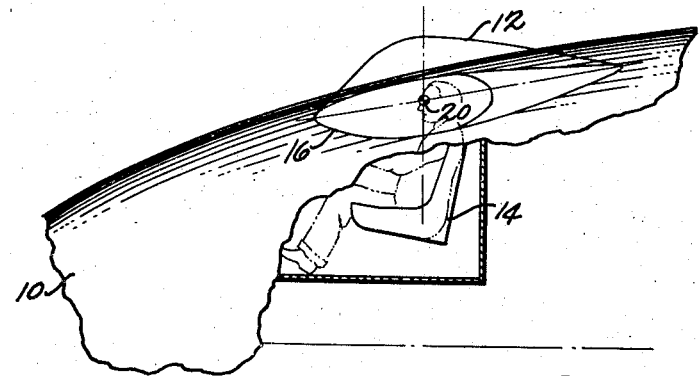
Figure 3 is a fragmentary side elevational view of the aircraft fuselage at the pilots' compartment location, part of the fuselage skin being cut away and the pilot shown in phantom lines to indicate his position in his individual head enclosure when seated for operation of the aircraft.

Each enclosure is geometrically constructed as shown in Figures 4 through 8 inclusive. The forward part indicated by the numeral 22 is cut from a true cylinder, the axis thereof being the line 24. At the upper edge of this cylindrical portion, defined by a line 26, a spherical portion 28 merges therewith in such manner that its center of symmetry lies on the line 24. The spherical portion is bounded by a line 30 indicating the plane at which the final portion 32 of the group of geometrical figures merges with the spherical portion 28. The final portion may be properly termed a parabolic conoid or paraboloid having its plane of symmetry common to those of the cylinder and the sphere. A line 34 is indicative of the fuselage skin line around the enclosure or, in other words, it indicates the line of merger of the two structures. A line 36 represents the axis of rotation of the paraboloid and it may be seen that this line intersects lines 24, 26 and 30 at a point 40 which is in the plane of symmetry. Therefore, the point 40 may be termed the center of curvature of the enclosure and it is substantially at that point that the pilot's eyes are positioned as indicated by the marker 20. The common plane of symmetry of the geometrical composite is then disposed at an angle from the vertical and substantially intersects the longitudinal vertical plane of the aircraft fuselage as shown in Figure 2.

Referring now to Figure 9, one of the enclosures is shown in a representative construction wherein a structural member 42 having a shape corresponding to the line of merger of the enclosure and the fuselage serves as a frame upon which the transparent geometrical portions are mounted. A fragment of the enclosure is cut away at 44 to indicate one method of attaching the transparent portions to the frame 42, the transparent material being molded into a channel-shaped section of the frame so as to be pressuretight.

In this same figure it may be seen that additional frame pieces 46 and 48 separate a forward portion and a rear portion of the enclosure from a central portion and the latter portion is individually framed by members 50 and 52. The central portion is thus a separate piece which includes all of the spherical section and part of the conic section. It may be lifted upward and away from the structural member 42 so as to provide an opening in the enclosure for use by the pilot as an emergency exit, but the framing members of the central section are constructed to have a pressuretight fit with the frame pieces 46, 48, and 42.

Figure 10 is identical with Figure 9 except that the central portion of the enclosure has been removed. Figure 11 shows the central portion as it appears after removal.

The central portion is very much a part of the enclosure as a whole and therefore it must be capable of being latched securely in place. On the other hand, since it also serves as an emeragency exit door it must be quickly removable. For this reason we have provided four plunger type latches 54 at each corner of the removable portion, the latches being fastened to the structural member 42.

One of the latches is shown in Figure 12 as having a housing 56 in which a plunger 58 is adapted to reciprocate. The plunger extends from each end of the housing and one end is adapted to pass through a hole in an ear 60 forming a part of the frame of the removable enclosure portion. The other end of the plunger attaches to a cable 62 which may be pulled to move the plunger from latching engagement with the ear 60.

Since there are four of the latches, one at each corner, it is convenient to interconnect the two on each side by the cable 62 so that a single pull on each cable will free the removable enclosure section quickly in event of emergency. The interconnecting cable may be seen in both Figures 9 and 10.

We claim:

1. In an aircraft fuselage, the upper surface of the forward portion of which is transversely curved: a pilot compartment in said forward portion; pilots' seats in said compartment to each side of and laterally spaced from the longitudinal vertical plane of symmetry of said fuselage; an opening in the fuselage wall above each seat; and an outwardly bulged enclosure over each opening, the uppermost portion of each said enclosures extending at least as high as a plane laid tangent to the fuselage surface at the intersection of said vertical plane of symmetry with said fuselage surface between said enclosures, the laterally outer portion of each of said enclosures extending laterally down the sloping side wall of said fuselage away from said plane of symmetry a substantial distance.

2. A construction as called for by claim 1 in which said fuselage tapers toward the nose thereof and said enclosures are located on the downwardly and forwardly sloping upper surface of the fuselage forward of the plane of maximum cross-section of said fuselage.

3. A construction as called for by claim 1 in which each enclosure has an outer contour comprising a portion of a cylindrical surface, a portion of a spherical surface, and a portion of a paraboloidal surface merging with each other in the order named.

4. A construction as called for by claim 1 in which said fuselage is substantially cylindrical in shape and each enclosure is formed with an outer contour comprising a portion of a cylindrical surface, a portion of a spherical surface, and a portion of a paraboloidal surface merging with each other in the order named, said surfaces having a common plane of symmetry passing substantially through the longitudinal axis of the fuselage at an angle from the vertical.

EDWARD F. BURTON.
ALLAN B. ROGERS, Sr.